Aug. 5, 1924.
T. J. FOLEY
1,503,786
AUTOMOBILE LOCK
Filed July 22, 1920
4 Sheets-Sheet 1
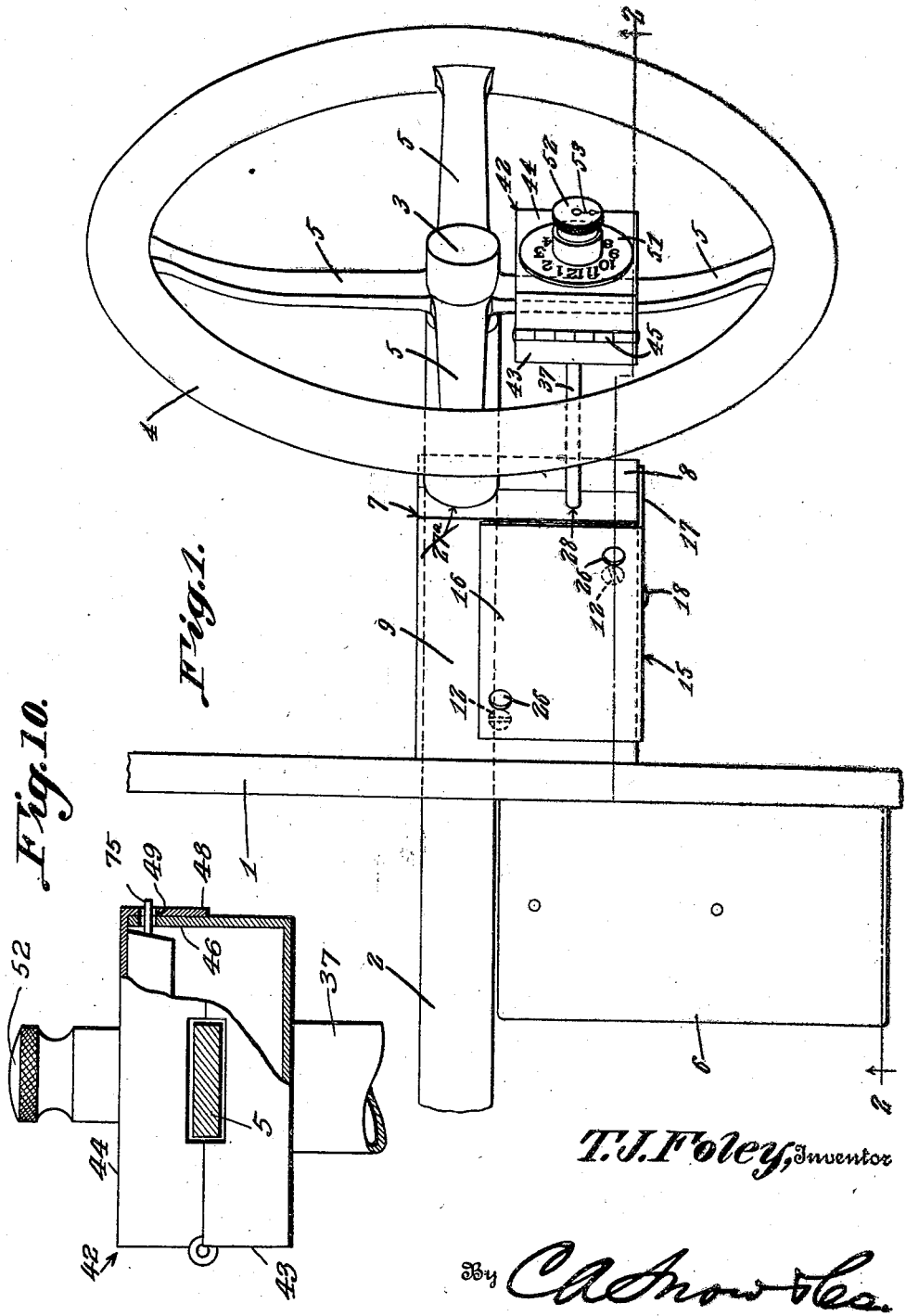

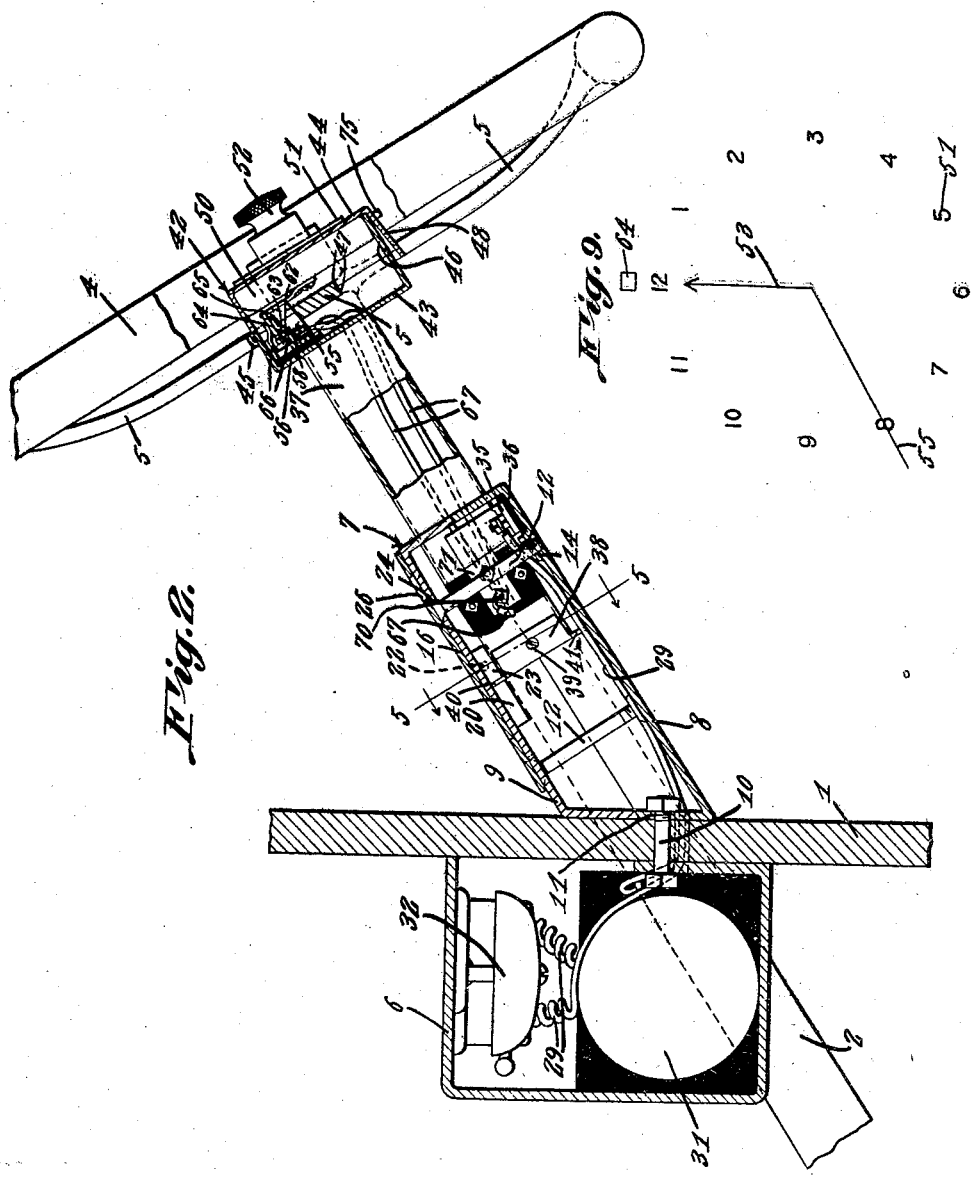

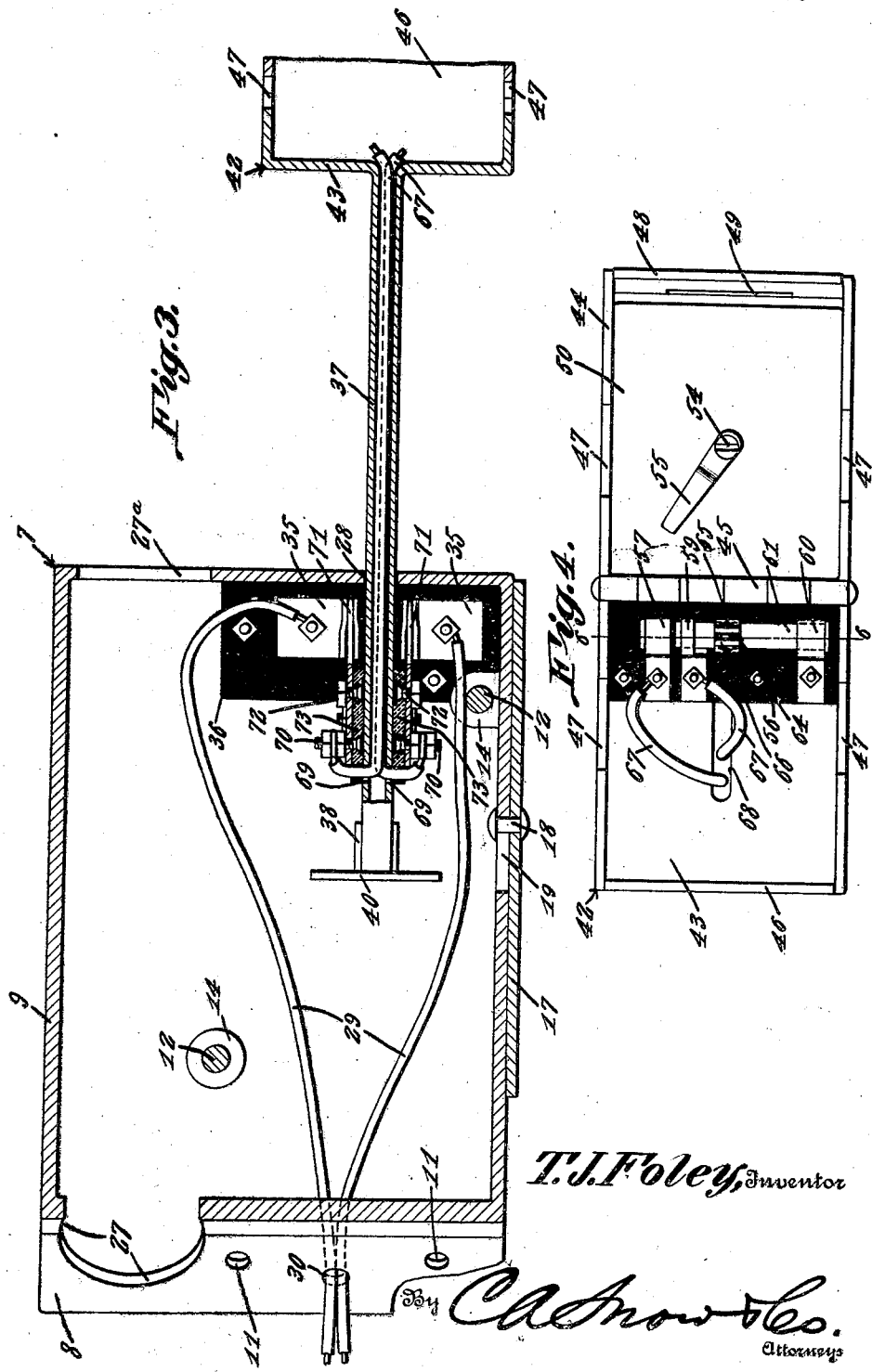

Aug. 5, 1924.
T. J. FOLEY
1,503,786
AUTOMOBILE LOCK
Filed July 22, 1920
4 Sheets-Sheet 4
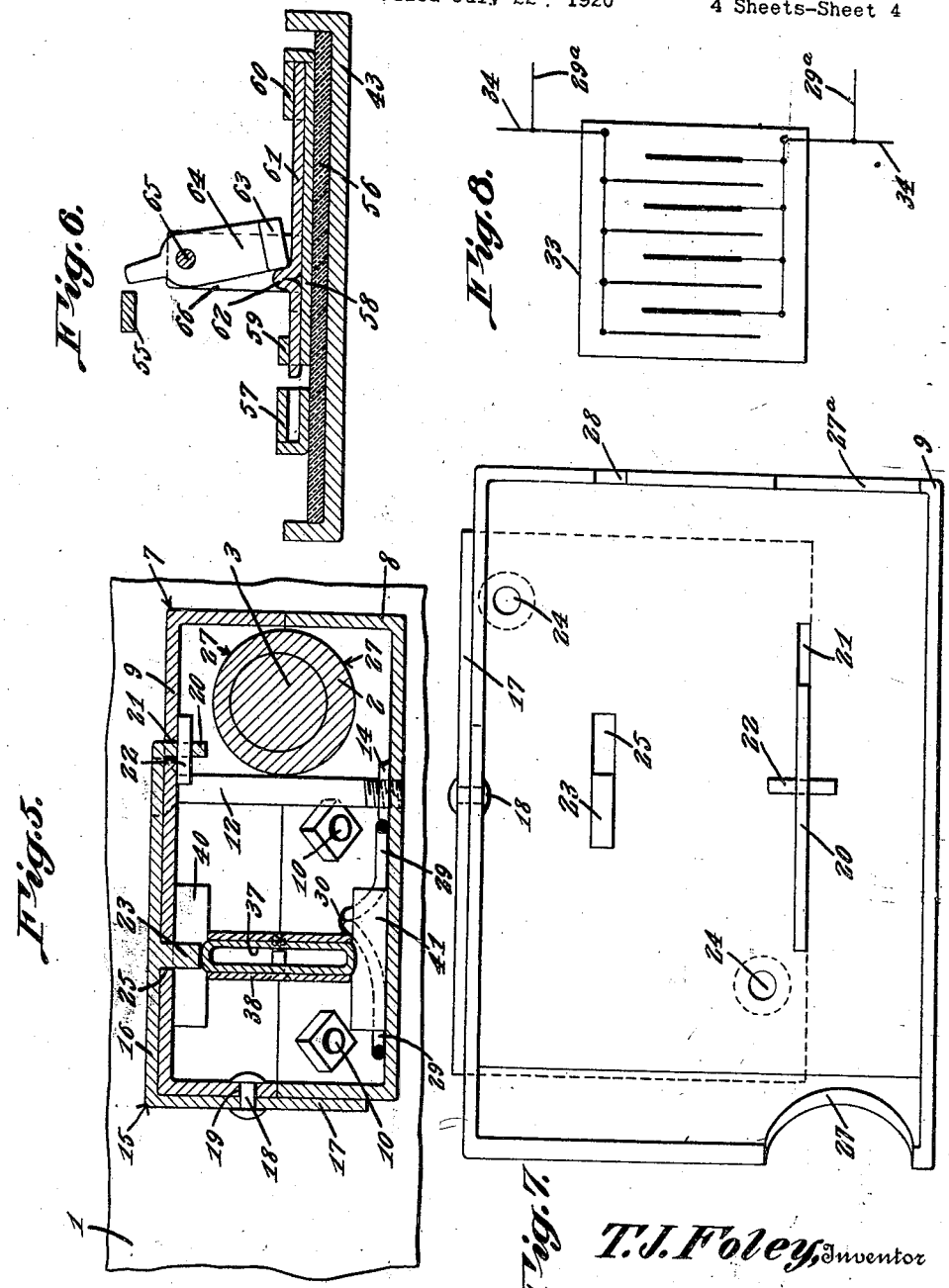
T.J.Foley, Inventor
By C.A.Snow&Co.
Attorneys Patented Aug. 5, 1924.

1,503,786

UNITED STATES PATENT OFFICE.

THOMAS JOHN FOLEY, OF MINNEAPOLIS, MINNESOTA.

AUTOMOBILE LOCK.

Application filed July 22, 1920. Serial No. 398,083.

*To all whom it may concern:*

Be it known that I, THOMAS J. FOLEY, a citizen of the United States, residing at Minneapolis, in the county of Hennepin and State of Minnesota, have invented a new and useful Automobile Lock, of which the following is a specification.

This invention aims to provide novel means whereby the steering wheel of an automobile or other conveyance may be locked against rotation, the construction being such that, should a person tamper with the locking means, a signal will be operated, thereby making it manifest to passers-by that an unauthorized manipulation of the vehicle is in progress.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Figure 2 is a section on the line 2—2 of Figure 1; Figure 3 is a fragmental longitudinal section taken through the housing, the slide and attendant parts; Figure 4 is a plan of the casing whereby the spoke of the steering wheel is gripped, the casing being opened; Figure 5 is a cross section on the line 5—5 of Figure 2; Figure 6 is a cross section on the line 6—6 of Figure 4; Figure 7 is a plan showing the cover of the housing, the cover being inverted from its normal position; Figure 8 is a diagram showing a minor modification; Figure 9 is a diagram alluded to in the description of the operation of the permutation lock. Fig. 10 is a detail sectional view with the lock casing shown in side elevation with parts broken out and in section to show the locking bolt engaging the casing to hold the casing and cover in locked relation.

The numeral 1 designates the dash board of a motor propelled vehicle, the steering column appearing at 2, a shaft 3 being journaled in the steering column, the shaft carrying a steering wheel 4 having spokes 5— all as usual.

As disclosed in Figures 1 and 2, a battery box 6 may be placed against the forward surface of the dash board 1. An upwardly and rearwardly inclined box-like housing 7 abuts at its forward end against the dash board 1. The housing 7 is a composite structure, comprising a base 8 and a cover 9. Securing elements 10, such as bolts, pass through openings 11 (Figure 3) in the forward end of the base 8 of the housing 7, the bolts extending through the dash board 1 and engaging the battery box 6. Thus, the battery box 6 and the housing 7 are held on the dash board 1.

The cover 9 is held on the base 8 by securing elements 12, which may be screws, the screws passing through openings 24 (Figure 7) in the cover 9, and entering bosses 14 on the base 8. The numeral 15 denotes a guard in the form of an angle member, the guard including flanges 16 and 17 disposed at right angles to each other. The flange 16 overlaps the top of the cover 9, the flange 17 extending downwardly along one side of the cover 9 and the base 8. A rivet 18 or the like (Figure 3) is mounted in the flange 17 of the guard 15 and slides in an elongated slot 19 fashioned in the side of the cover 9. The inner edge of the flange 16 of the guard 15 is provided with a depending ear 20 (Figures 5 and 7), the ear being mounted to reciprocate in an elongated slot 21 formed in the top of the cover 9. A pin 22 passes through the ear 22 and is in slidable engagement with the top of the cover 9. The flange 16 of the guard 15 is supplied with a depending lug 23, mounted to move in an elongated slot 25 fashioned in the top of the cover 9. The flange 16 of the guard 15 is provided with holes 26, so located that they will give access to the securing elements 12 which connect the cover 9 of the housing 7 with the base 8 thereof.

It will be observed that the battery box 6 and the box-like housing 7 cannot be removed easily from the dash board 1, because the ends of the securing members 10 are located respectively within the box 6 and within the housing 7. The screws 12 which connect the cover 9 of the housing 7 with the base 8 thereof cannot be removed, in practice, because, under conditions to be pointed out hereinafter, the guard 15 may be advanced, as shown in Figure 1 until the holes 26 in the flange 16 of the guard do not register with the heads of the screws 12. Let it suffice at this point to state, that the lug 23 on the flange 16 of the guard 15 cooperating with another part to be described hereinafter, constitutes means whereby the guard 15 is advanced until it assumes the position delineated in Figure 1. The guard 15 cannot be removed readily from the housing 7, because the flange 17 of the guard is connected by the rivet 18 to one side of the cover 9, and for the further reason that the ear 20 is held in the slot 21 of the cover 9 by the pin 22. So far as the description has proceeded, it will be clear that, as a practical proposition, the housing 7 and the battery box 6 cannot be removed from the dash board 1 until the guard 15 is moved to the right (Figure 1) far enough to aline the holes 26 with the heads of the screws 12. Then, the screws 12 may be removed, the cover 9, along with the guard 15, may be removed from the base 8, and access will be given to the securing members 10 so that both the base 8 and the battery box 6 may be detached from the dash board 1. Noting Figures 3 and 7, it will be observed that the forward portions of the base 8 and the cover 9 of the housing 7 are supplied with notches 27, the rear portions of the parts mentioned being equipped with notches 27$^a$, the notches 27$^a$ and the notches 27 defining openings through which the steering column 2 passes. The rear walls of the base 8 and the cover 9 of the housing 7 have notches 28, forming an opening for the reception of a slide 37, to be described hereinafter.

Comparing Figures 3 and 2, conductors 29 are shown, the same extending through an opening 30 in one end of the base 8 of the housing 7, the conductors passing through the dash board 1 into the battery box 6, and constituting a part of an electrical circuit, comprising a battery 31 and a signal of some kind, preferably a bell 32, disposed in the box 6. At this point, it should be noted that the battery 31 may be dispensed with if desired. Thus, in Figure 8, the numeral 33 denotes a storage battery constituting a part of the ignition system of the automobile, the leads being denoted by the numeral 34. Conductors 29$^a$ may be branched off the leads 34, the conductors 29$^a$ having the same function as the conductors 29. Reverting to Figure 3, the rear ends of the conductors 29 are connected to switch members 35 carried by an insulating strip 36 mounted in the base 8. A slide 37, hereinbefore mentioned, is mounted for longitudinal reciprocation in the opening defined by the notches 28, the slide being of flattened tubular cross section, as Figure 5 best discloses.

A U-shaped piece 38 is attached by a screw 39 or otherwise to the forward end of the slide 27, the element 38 being provided with an upper transverse head 40 and a lower transverse head 41. As disclosed in Figure 5, the head 40 slides in contact with the top of the cover 9, the head 41 sliding in contact with the bottom of the base 8. The head 40 is so located that it can engage the lug 23 on the flange 16 of the guard 15. Consequently, when the slide 37 is drawn rearwardly, the guard 15 will be drawn rearwardly into the position shown in Figure 1, the holes 26 being disposed out of registration with the screws 12, as and for the purpose hereinbefore set forth.

The numeral 42 has been used to designate, generally, a box-like casing, the casing including a body 43 and a lid 44, connected by a hinge 45. The body 43 of the casing 42 is attached to or formed integrally with the rear end of the slide 37. The forward end of the body 43 is prolonged to form a tongue 46 (Figure 2) extended upwardly behind the corresponding end wall 48 of the lid 44, the parts 46 and 48 having slots 49 for the reception of a locking bolt 75, hereinafter mentioned, the slot 49 of the wall 48 appearing in Figure 4. The lid 44 carries a permutation lock 50. The lock 50 is not described in detail, because it may be of any desired construction, and because I am aware of the fact that a permutation lock, if new, cannot be claimed in the same application with a signal mechanism. For the purposes of the present invention, it is enough to state that the permutation lock 50 comprises a dial 51, a knob 52 having an index 53 adapted to cooperate with the dial, and a shaft 54 carrying, at its outer end, the knob 52, carrying, at its inner end an arm 55 located within the casing 42. The bolt of the permutation lock 50 is denoted by the numeral 75 and is received in the slots 49 of the tongue 46 and the wall 48 to hold the lid 44 closed with respect to the body 43. The body 43 and the lid 44 are supplied with notches 47 (compare Figures 4 and 2), the notches 47 being adapted to receive one spoke 5 of the steering wheel 4, when the slide 37 is drawn rearwardly and when the lid 44 of the casing 42 is closed on the body 43 thereof.

In the body 43 of the box casing 42 is located an insulating plate 56 on which is mounted a terminal 57. A strip 58, (Figure 6) is secured to the insulating plate 56 and has guides 59 and 60, the guide 59 constituting a terminal, adapted to cooperate with the terminal 57. A slide 61 is mounted to reciprocate in the guides 59 and 60 and when advanced, engages the terminal 57. Intermediate its ends, the slide 61 is supplied with a projection 62 lying in the path of the foot 63 of a lever 64 fulcrumed intermediate its ends at 65 on a bracket 66 carried by the insulation plate 56, one end of the lever 64 being so located that it can be engaged by the arm 55 which forms part of the permutation lock 50. Conductors 67 shown in Figure 4 are connected to the terminals 57 and 59 and extend through an opening 68 in the body 43 of the box casing 42. Then, the conductors 67 extend through the slide 37 (Figure 3) and pass outwardly through openings 69 in the slide, the conductors being connected to binding posts 70 on tongues 71 secured at 72 to insulating blocks 73 which when the slide 37 is moved rearwardly, the tongues 37 engage with the switch members 35 which are located in the housing 7.

Let it be supposed that it is desired to lock the steering wheel 4 against rotation. Then, the side 37 is drawn rearwardly, the tongues 71 engaging the switch members 35. The rear movement of the slide 37 locates the casing 42 so that, when the lid 43 is opened and then closed, a spoke 5 of the steering wheel 4 may be received in the notches 47 which are fashioned in the lid 44 and the body 43 of the casing 42. The bolt 75 serves to prevent the lid 44 of the casing 42 from being opened with respect to the body 43 and, consequently, the steering wheel 4 is held against rotation.

Before the casing 42 is closed to grip the spoke 5 of the steering wheel 4, the slide 61 is retracted, so that it does not engage the terminal 57. Consequently, the signal circuit is open, the circuit comprising the terminal 57, one conductor 67, one tongue 71, one switch member 35, one conductor 29, the battery 31, the signal 32, the other conductor 29, the other switch member 35, the other tongue 71, the other conductor 67, the terminal 59 and the slide 61.

If some person who is ignorant of the combination whereby the lock 50 may be manipulated to permit an opening of the casing 42, should turn the shaft 54 by way of the knob 52, the arm 55 will engage one end of the lever 64 and tilt the lever on its fulcrum 65, the foot 63 of the lever 64 engaging the projection 62 on the slide 61, the slide being advanced until it engages the terminal 57. Thus, the signal circuit above alluded to will be closed, and the signal 32 will be operated. The construction is such that, if the signal 32 is in the form of a bell, the bell will continue to ring until the casing 42 is opened, and the slide 61 moves by hand out of engagement with the terminal 57, to open the signal circuit.

The arm 55 of the permutation lock may be so set with respect to the index 53, as indicated in Figure 9 that the lock 50 may be manipulated, to set up the proper combination, without causing the arm 55 to tilt the lever 64 and work the slide 61 to close the circuit at the point 57. Thus, an inspection of Figure 9 will render it evident that such a combination as left to 8, right to 2, and left to 12 may be made without tilting the lever 64. Similarly, the shaft 54 of the lock may be rotated by the knob 52 enough to destroy the combination and to dispose the lock to closed position, without swinging the lever 64, operating the slide 61 and closing the signal circuit.

Briefly stated, the device forming the subject matter of this application includes, among other combinations, a wheel grip 42 comprising relatively movable parts 44 and 43, a lock 50 connecting said parts, a support 7, a slide 37 mounted to move in the support and carrying the grip whereby the grip may be disposed adjacent to the wheel 4 to be locked, a signal 32, a circuit including the signal, a normally open switch 71—35 in the circuit and closed when the slide is moved to dispose the grip adjacent to the wheel to be locked, and a slide 61—57 in the circuit and operable by the lock 50, which connects the parts 44 and 43, to close the said switch.

Having thus described the invention, what is claimed is:—

1. In a steering wheel lock, a wheel grip comprising relatively movable parts; a lock comprising means for holding said parts against relative movement; a support; a slide mounted to move in the support and carrying the grip whereby the grip may be disposed adjacent to the wheel to be locked; a signal; a circuit including the signal; a normally open switch in the circuit; means for closing the switch when the slide is moved to dispose the grip adjacent to the wheel to be locked; a second normally open switch in the circuit; and means operable by the lock to close said switch only when the parts of the wheel grip are in closed position and only upon improper manipulation of the lock.

2. In a steering wheel lock, a wheel grip comprising relatively movable parts; a lock comprising means for holding said parts against relative movement; a support; a slide mounted to move in the support and carrying the grip whereby the grip may be disposed adjacent to the wheel to be locked; a signal; a circuit including the signal, a normally open switch in the circuit; and means for operating the switch from the lock to close the circuit, said means being rendered unresponsive to the lock after having been once operated, until said means is reset by an operator.

3. In a steering wheel lock, a wheel grip comprising relatively movable parts; a lock comprising means for holding said parts against relative movement; a housing comprising a base and a cover; a securing element connecting the base and the cover; a guard slidable on the housing and having an opening giving access to the securing element; a slide mounted to move in the housing and carrying the grip whereby the grip may be disposed adjacent to the wheel to be locked, the slide embodying means coacting with the guard, to move the guard and to dispose the opening out of alinement with the securing element; a signal; a circuit including the signal; a normally open switch in the housing and interposed in the circuit; means for closing the switch when the slide is moved to dispose the grip adjacent to the wheel to be locked; a second normally open switch in the circuit; and means operable by the lock to close the said switch only when the parts of the wheel grip are in closed position and only upon improper manipulation of the lock.

In testimony that I claim the foregoing as my own, I have hereto affixed my signature in the presence of two witnesses.

THOMAS JOHN FOLEY.

Witnesses:
THOMAS J. DEGNAN,
HALVOR N. REBNEY.